US005225617A

United States Patent [19]

Hotta

[11] Patent Number: 5,225,617

[45] Date of Patent: Jul. 6, 1993

[54] SELECTION DEVICE FOR TONE CONTROL IN AN ELECTRONIC MUSICAL INSTRUMENT

[75] Inventor: Harumichi Hotta, Hamamatsu, Japan

[73] Assignee: Yamaha Corporation, Hamamatsu, Japan

[21] Appl. No.: 820,354

[22] Filed: Jan. 14, 1992

[30] Foreign Application Priority Data

Jan. 17, 1991 [JP] Japan .................................... 3-17147

[51] Int. Cl.[5] .............................................. G09B 15/02

[52] U.S. Cl. .................................................. 84/477 R

[58] Field of Search ...................... 84/477 R, 478, 600, 84/615-620

[56] References Cited

U.S. PATENT DOCUMENTS 4,704,931 11/1987 Nagai et al. ........................... 84/600
4,773,294 9/1988 Iizuka et al. .
4,915,007 4/1990 Wachi et al. .................. 84/477 R X
4,920,850 5/1990 Matsumoto et al. ......... 84/477 R X
5,085,116 2/1992 Nakata et al. ................ 84/477 R X
5,085,117 2/1992 Morokuma et al. .................. 84/615

*Primary Examiner*—Stanley J. Witkowski
*Attorney, Agent, or Firm*—Graham & James

[57] ABSTRACT

When a switch for selecting tone control information has been operated once, presence of a first mode for selecting the tone control information is judged and when the switch has been continuously operated for predetermined plural times, presence of a second mode for adjusting contents of the tone control information is judged. When presence of the first mode has been judged, processing of the first mode for selecting the tone control information corresponding to the switch is executed. In this case, the switch functions as a switch for selecting desired tone control information in accordance with the proper purpose of the switch. When presence of the second mode has been judged, processing of the second mode for adjusting contents of the selected tone control information is executed. In this case, the switch functions as a switch for changing the mode from the first mode to the second mode. By differing the manner of operation in this manner, the same switch therefore can be provided with plural functions so that no particular mode selection switch is required.

9 Claims, 7 Drawing Sheets

GN=0

SELECTED VOICE DISPLAY

GN=1

UT VOICE MENU

GN=2

UT VOICE ADJUSTING SCREEN 1

GN=3

UT VOICE ADJUSTING SCREEN 2

SELECTION DEVICE FOR TONE CONTROL IN AN ELECTRONIC MUSICAL INSTRUMENT

BACKGROUND OF THE INVENTION

This invention relates an electronic musical instrument having switches for selecting and setting tone control information such as tone color, tone volume and effects.

In U.S. Pat. No. 4,773,294, an electronic musical instrument is disclosed in which selection can be made between a first mode in which a tone color which is preassigned to a switch called a white switch and therefore is proper to this switch can be selected by operating the white switch and a second mode in which any desired tone color can be assigned to the white switch and the desired tone color assigned to this switch can be selected by operating the switch whereby this switch is provided with double functions. In this electronic musical instrument, selection of the mode is made by operating a switch called a multi-menu switch.

It has also been conceived in the past to suitably set and select a parameter corresponding to tone control information by a manual operator or to preset such parameter and merely select the preset parameter without troublesome operation of a setting operator. In this case, it is common to provide the parameter setting manual operator and the preset selection means separately.

Known also in the art is a device for displaying a tone control parameter by a display screen to confirm selected data and selecting a parameter according to the display. In the prior art device, when a display screen is changed by operation of a switch or the like, the screen is changed without exception and it is not possible to prohibit change of the screen when necessary.

Since in the prior art device, a switch for selecting a mode (i.e., selecting a function) in addition to a switch having double function, there is not much room for reducing the number of switches and, accordingly, improvements are desired in the space for arranging switches, manufacturing cost and operability.

Further, the automatic change in the display screen in the prior art device is inconvenient when, in or setting tone control information, it is desired to maintain a previous display screen notwithstanding selection or setting of tone control information. The prior art device therefore lacks operability and flexibility in this respect.

SUMMARY OF THE INVENTION

It is, therefore, a first object of the invention to provide an electronic musical instrument capable of changing the switch function without requiring a separate switch for selecting a mode (function).

It is a second object of the invention to provide an electronic musical instrument with improved relation between a manual operator for setting a parameter and preset selection means having regard to space for arranging switches and operability.

It is a third object of the invention to provide an electronic musical instrument having a function to hold display of a screen displaying selected tone control information.

For achieving the first object of the invention, the electronic musical instrument according to the invention comprises switch means for selecting tone control information, mode judging means for detecting whether said switch means has been operated once or continuously for predetermined plural times and, responsive to this detection, judging presence of a first mode in which said tone control information is to be selected when said switch means has been operated once and presence of a second mode in which contents of said tone control information which has been selected by the first operation are to be adjusted when said switch means has been continuously operated, first mode executing means for executing, when said mode judging means has judged presence of the first mode, selection of the tone control information corresponding to the operation of said switch means, and second mode executing means for executing when said mode judging means has judged presence of the second mode, adjustment of the contents of the tone control information which has been selected by the operation of said switch means.

When the switch means for selecting tone control information has been operated only once, presence of the first mode for selecting the tone control information is judged whereas when the switch means has been operated continuously, presence of the second mode for adjusting contents of the tone control information which has been selected by the first operation is judged. Thus, the mode is automatically judged in accordance with the number of times of operation of the switch means and the function of the switch means is automatically changed. That is, when presence of the first mode has been judged, processing of the first mode for selecting the tone control information corresponding to the operation of the switch means is executed. In this case, the switch means performs a function of a switch for selecting desired tone color information in accordance with the proper purpose of the switch. When presence of the second mode has been judged, processing of the second mode for adjusting contents of the selected tone control information is executed. In this case, the switch means performs a function of a switch which changes the mode from the first mode to the second mode. Therefore, by differing the manner of operation of the same switch, the same switch can be provided with plural functions, so that no particular mode selection switch is required with resulting advantages in the space for arranging switches and operability. Besides, when the switch has been continuously operated, the switch functions this time as a switch of the mode for adjusting contents of the tone control information which has been selected by the first operation, so that operation of the switch can be facilitated.

For achieving the second object of the invention, an electronic musical instrument according to the invention comprises display means for displaying parameters for tone control, selecting means for selecting one of the displayed parameters or a certain preset parameter, memory means for storing data indentifying the preset parameter, display control means for displaying, when one of the displayed parameters has been selected by said selection means, selection of this parameter in said display means and for displaying, when the preset parameter has been selected, selection of the preset parameter in said display means, and tone control means for performing, when a desired parameter among the displayed parameters has been selected by said selection means, control of a tone in accordance with the selected parameter and for performing, when the preset parameter has been selected by said selection means, control of a tone in accordance with the data of the preset parameter which is stored in said memory means.

In the display means, parameters for tone control are displayed. By using the common selection means, one parameter among the displayed parameters or the preset parameter is selected. When one of the displayed parameters has been selected by the selection means, selection of this parameter is displayed in the display means. When the preset parameter has been selected by the selection means, selection of the preset parameter is displayed in the display means. When one of the displayed parameters has been selected, tone control is made in accordance with the selected parameter whereas when the preset parameter has been selected, tone control is made in accordance with data of the preset parameter stored in the memory means. Thus, selection of a desired parameter (i.e., manual setting) and selection of a preset parameter for tone control can be made by the common selection means, so that operability is improved and the number of the selection means (i.e., switches) can be saved with resulting advantages in the space for arranging switches and manufacturing cost.

For achieving the third object of the invention, an electronic musical instrument according to the invention comprises display means for displaying tone control information, switch means for performing at least one of selection, setting and adjusting about the tone control information, control means for controlling to change, in accordance with performance of said switch means, a display of said display means in response to the performance of said switch means, hold switch means for designating to prohibit change of the display of said display means, and prohibition control means for prohibiting, when the prohibition has been designated by said hold switch means, the change of the display of said display means by said control means.

Normally, when the switch means for selecting or setting or adjusting tone control information has been operated, a display screen is changed to a screen corresponding to the operation. When, however, the hold switch means has been operated, the hold mode is brought about in which change of the display screen is prohibited so that the screen before operation of the switch means is maintained even when the switch means for selecting, setting or adjusting the tone control information is operated. Accordingly, in a case where selection or setting or adjusting of tone control information is performed but it is desired to maintain an old screen display (e.g., when it is more advantageous for adjustment of the tone control information to maintain the old screen than to change to a new screen), it is convenient to bring about the hold mode by operating this hold switch.

The term "tone control information" herein is used for comprehensively designating all information concerning various tone elements or tone control elements such as tone color, tone volume, effects, rhythm and performance function of a tone. Tone control information therefore is not limited to information including tone color used in an embodiment described below.

An embodiment of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
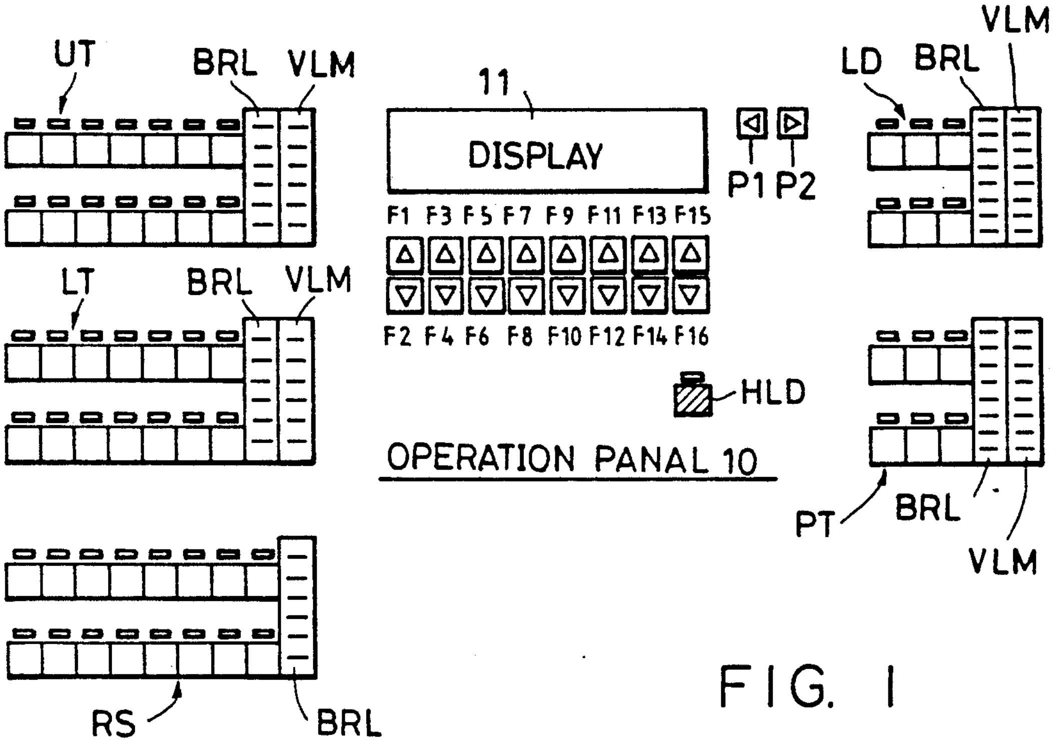
FIG. 1 is a diagram showing an example of arrangement of switches and a display on an operation panel in an electronic musical instrument according to the invention.

FIG. 1 shows an example of arrangement of switches and display on an operation panel 10 in the electronic musical instrument of this embodiment. The electronic musical instrument of this embodiment has an upper keyboard, lower keyboard and pedal keyboard and includes switch groups each consisting of tone color switches for selecting a tone color of a tone played in each of the keyboards, i.e., upper keyboard tone color switches UT, lower keyboard tone color switches LT and pedal tone color switches PT. This electronic musical instrument has also a function of preferentially selecting one key among keys depressed in the upper keyboard and generating the tone of this key with a special tone color. In the present embodiment, this special tone generated in this manner will be referred to as a lead tone. There are provided lead tone color switches LD for selecting a tone color of a lead tone. There are also provided rhythm selection switches RS for selecting a rhythm name in an automatic rhythm performance. These switches are made of, for example, self-return type push switches and light-emitting elements such as LEDs are attached to respective switches for displaying that these switches are on. There are also provided a tone volume operator VLM and a brilliance operator BRL attached to each of the tone color switch groups UT, LT, PT and LD, and also a tone volume operator VLM attached to the rhythm selection switch group RS. By way of example, these operators VLM and BRL are made of touch switches (contact type switches) of plural stages and are capable of setting tone volume level and tone color adjusting level from a brilliant tone to a mellow tone. For convenience of description, these grouped tone color switches UT, LT. PT and LD and rhythm selection switches RS will be sometimes referred to as "tone group switches".

A display 11 is made of a liquid crystal display or other type of display. The screen of the display 11 is changed as required and a necessary display is made in each changed screen. Change in the screen of the display 11 is made mainly in response to switching operation of the tone color switches UT–LD and rhythm selection switches RS. In the state where specific tone control information is displayed, contents of display are changed to a next page or preceding page in accordance with operation of a next page or preceding page switches P1 or P2. Eight pairs of switches, each pair consisting of up and down switches, which are arranged laterally along the lower edge of the display 11 are data control switches F1–F16. The function of these switches F1–F16 is changed to one of several functions such as a function for adjusting contents of parameter data displayed in the display 11 and a function for selecting parameter data in accordance with contents of display. These switches F1–F16 whose function is changed in accordance with the contents of display will be hereinafter sometimes referred to as "function switches".

Hold switches HLD are switches which are operated when change of the screen of the display 11 should be prohibited and the screen display state before switch operation such as tone color selection was made (this operation is inherently accompanied by changing of the screen of the display 11) should be maintained.

Figure 2:
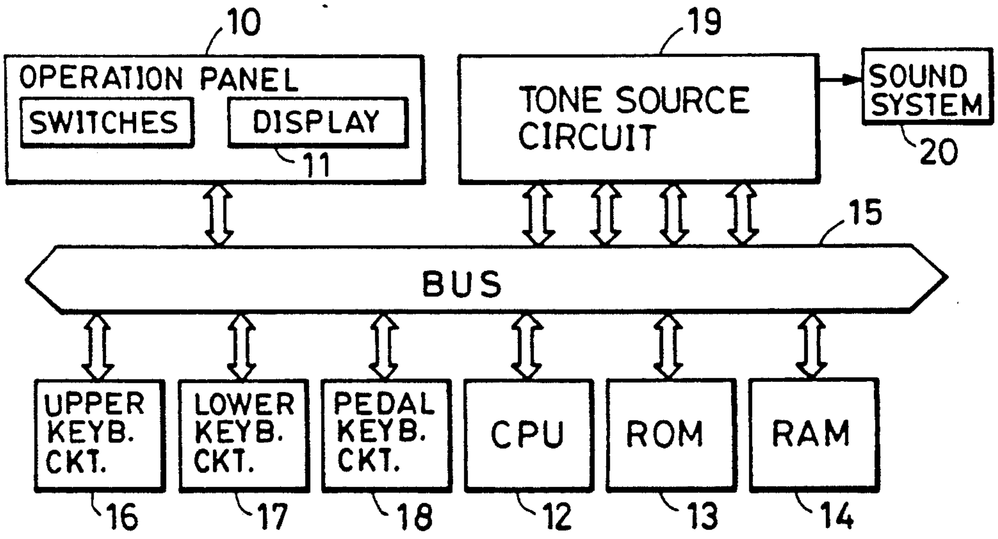
FIG. 2 is a block diagram schematically showing a hardware circuit construction of the electronic musical instrument of this embodiment.

FIG. 2 is a block diagram schematically showing the hardware circuit construction of the electronic musical instrument of this embodiment. Various operations of this electronic musical instrument are executed by a microcomputer section including a CPU (central processing unit) 12, a ROM (including a program ROM section and a data ROM section when necessary) 13 and a RAM (including a data RAM section and a working RAM section) 14. The switches and display 11 on the operation panel 10 are connected to the microcomputer section through a data and address bus 15 and keyboard circuits 16, 17 and 18 of the upper keyboard, lower keyboard and pedal keyboard are connected similarly to the microcomputer section. The microcomputer section executes various processing necessary for the electronic musical instrument including known processing such, for example, as key scanning of the keyboards, switch scanning of the panel and key assigning to tone generation channels and, as will be described in detail, novel processing which is proposed in the present invention. The number of CPU 12 is not limited to one but a known dispersed construction including plural CPUs may be employed.

A tone source circuit 19 generates tone signals in plural tone generation channels. The tone source circuit 19 can generate not only a tone which has been selected in a keyboard but also rhythm tones and automatic performance tones and it can also perform various tone controls such as setting and controlling of tone pitch, tone color and tone volume and imparting of effects. A tone of a key depressed in each of the keyboards is generated with a tone color which has been selected by the tone color switch UT, LT or PT of the keyboard. A lead tone is generated with a tone color which has been selected by the lead tone color switch LD. The tone signal which has been generated is digital-to-analog converted and thereafter is supplied to a sound system for acoustic sounding therefrom.

Figure 3:
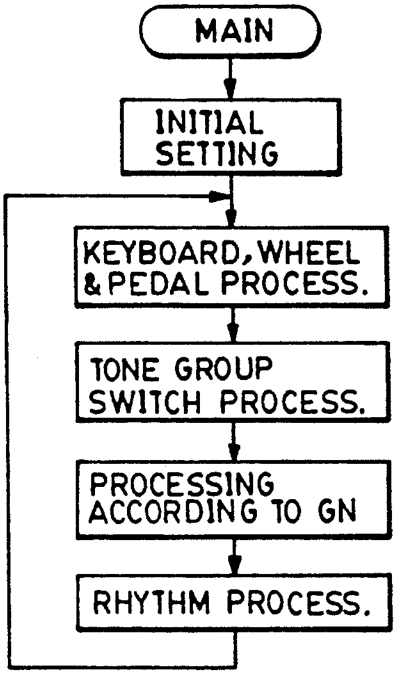
FIG. 3 is a diagram showing a main routine of an example of processing executed by a microcomputer section of the embodiment of FIG. 2.

FIG. 3 schematically shows a main routine of an example of processing executed by the microcomputer section of this embodiment.

After a predetermined initial setting processing, keyboard related processing (keyboard processing) including key switch scanning of respective keyboards and tone assignment to respective channels is executed and processing for detecting amounts of operation of associated operators (such as modulation wheel and tone volume and effect control pedals) is executed.

Figure 5:
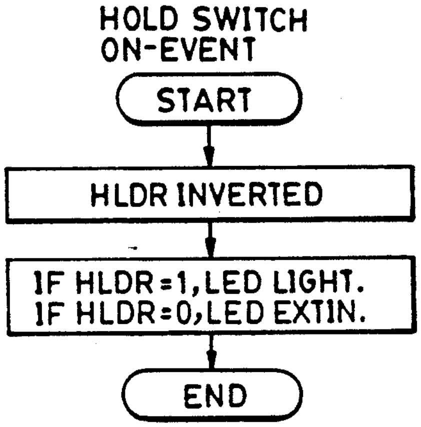
FIG. 5 is a diagram showing an example of a flow chart of a hold switch on-event processing.
Figure 4:
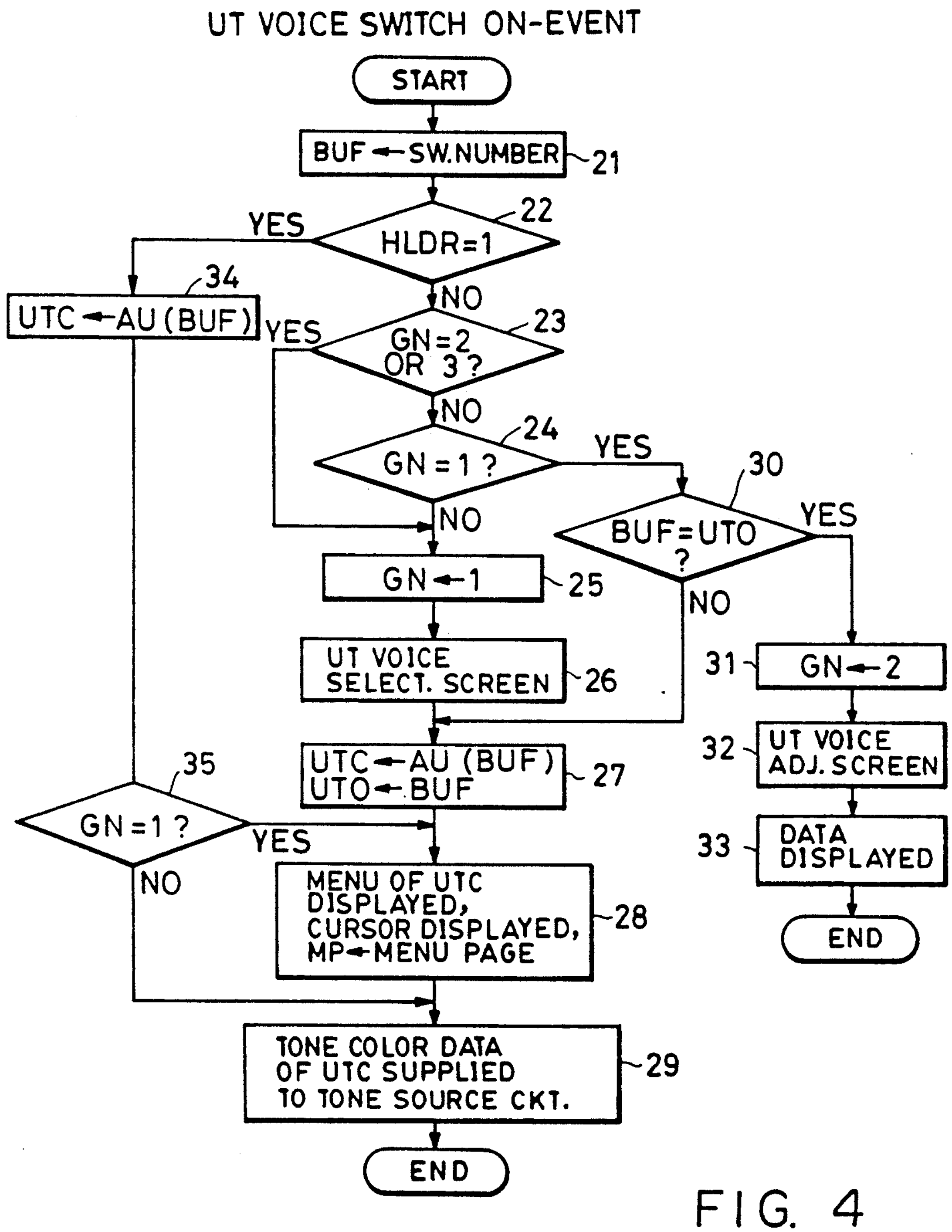
FIG. 4 is a diagram showing an example of a flow chart of an on-event processing of an upper keyboard tone color (UT voice) switch.

Then, in the block of "tone group switch processing", presence or absence of switch-on event of each tone group switches UT, LT, PT, LD and RS is detected and an on-event processing corresponding to a switch in which an on event has taken place is executed. As an example of this tone group switch-on event processing, an example of flow chart of an on-event processing for the upper keyboard tone color switches UT is shown in FIG. 4. In this block, when an on-event of the hold switch HLD has been detected, a hold switch on-event processing as shown in FIG. 5 is executed.

In this block of "tone group switch processing", screen number GN is set and the screen of the display 11 is changed in accordance with presence or absence of an on-event in the tone group switches UT, LT, PT, LD and RS and the manner of operating the switch (single operation or continuous operation).

In next block, the screen number GN is examined and a predetermined processing according to a detected value is executed. In this processing, in accordance with the screen number GN, an on-event of the data control switches F1–F16 is mainly examined and a processing according to the on-event is executed. Examples of the on-event processing of some of the switches F1–F16 in some cases of the screen number GN are shown in FIGS. 6–11.

In next block, processing related to the rhythm performance such as a start/stop processing for the automatic rhythm and a tempo count processing is executed. Processing related to the rhythm selection is made in the tone group switch processing.

Examples of specific operations and specific flow charts will now be described.

Figure 12:
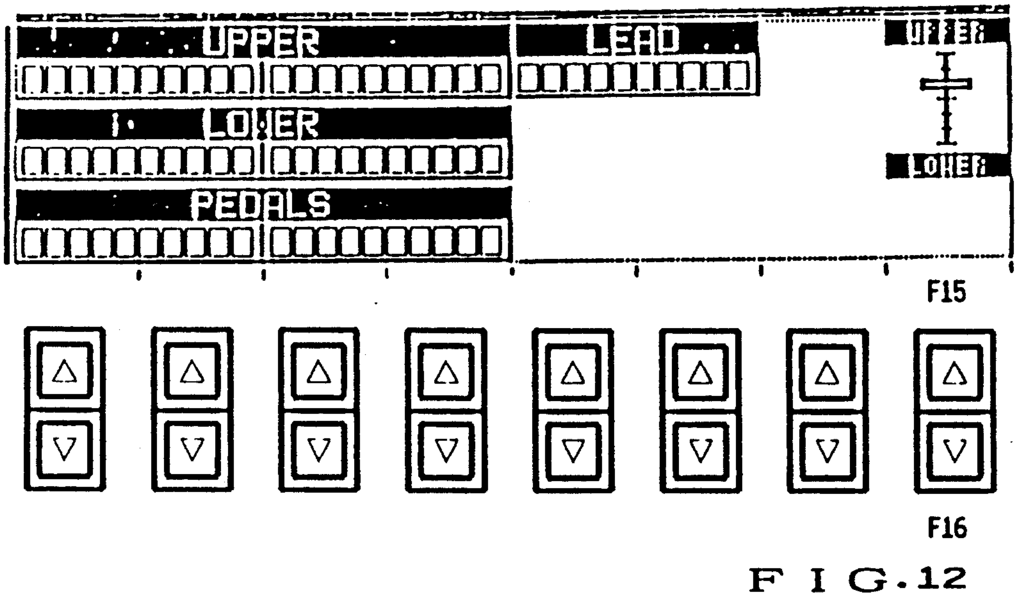
FIG. 12 is a diagram showing an example of a selected tone color display screen displayed in the display of FIG. 1.

In a case where an on-event of tone group switches has not been detected in the tone group switch processing of the main routine, the screen number GN is 0 and the screen of the display 11 becomes a selected voice display as shown in FIG. 12. In this screen, names of tone colors which are currently selected in the upper, lower and pedal keyboard tone groups and lead tone groups (i.e., name of voice) are displayed and tone volume balance between the upper keyboard and the lower keyboard can be adjusted by increment/decrement operation of the switches F15 and F16.

Description will now be made about a case where some switch in the tone group switches has been operated only once. In this case, this switch functions as a switch for selecting tone control information (in this case, tone color, i.e., name of voice or rhythm).

For example, it is assumed that a certain switch in the upper keyboard tone color switches UT has been operated once. In this case, the processing of FIG. 4 is executed. Since this is a first on-event, the screen number is 0. It is also assumed that the hold switch HLD is not on. First, number data of the turned on switch is stored in a buffer BUF (step 21). In next step 22 of "hold register HLDR=1", the hold switch HLD is not on so that result is NO. Since GN is 0, steps 23 and 24 are also NO and GN is set to 1 in step 25.

Thus, the screen number GN is set to 1. This represents that the upper keyboard tone color switch UT has functioned as a switch selecting a tone color, i.e., voice. When, for example, a switch selecting the tone color of organ has been turned on, this switch has really functioned as a switch selecting the tone color of organ.

In next step 26, preparation is made for displaying the upper keyboard tone color selection screen in the display 11. A tone color code (designated by AU(BUF)) is read from an upper keyboard assigned tone color code table AU in accordance with switch number data of the turned on tone color switch which is stored in the buffer BUF and the read out tone color code is stored in an upper keyboard tone color code register UTC. Further, the switch number in the buffer BUF is stored in an old register UTO (step 27). Accordingly, the tone color code of the selected tone color is stored in the upper keyboard tone color code register UTC and the switch number of the turned on switch is stored in the old register UTO. An arrangement is made so that a suitable tone color can be assigned to each switch of the tone group switches and the tone color codes assigned to the respective switches are stored in the upper keyboard assigned tone color code table AU. Contents of the assigned tone colors can be changed as desired.

Figure 13:
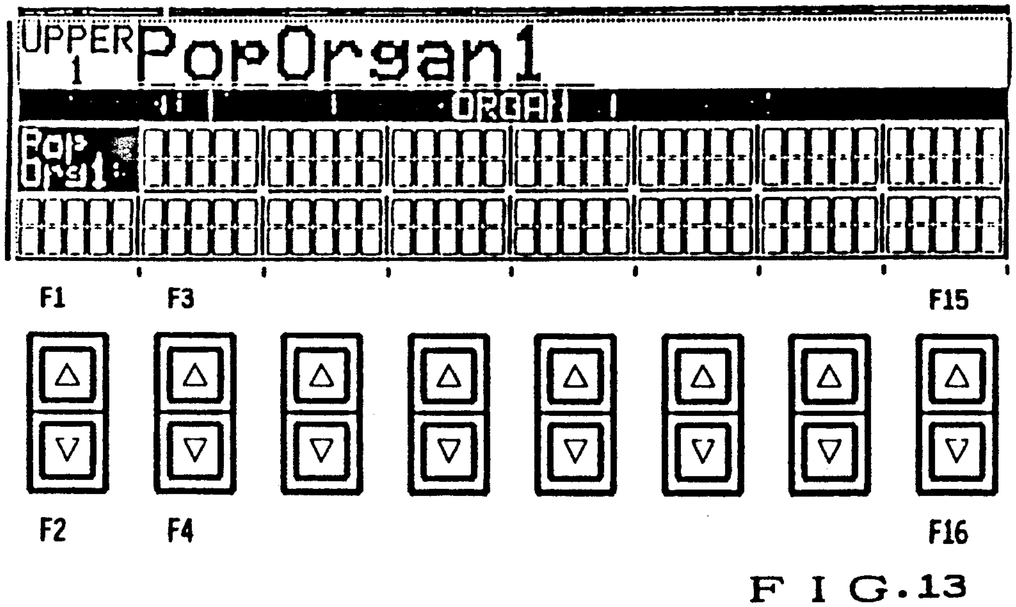
FIG. 13 is a diagram showing an example of an upper keyboard tone color (UT voice) menu screen.

Then, a menu corresponding to the tone color code in the register UTC is displayed in the display 11 and a tone color name display position corresponding to the register UTC is displayed by a cursor (step 28). The page number of this menu is stored in a menu page register MP. An example of the menu is shown in FIG. 13. In this menu screen, it is displayed that "PopOrgan 1" has been selected as the upper keyboard tone color and names of various organ tone colors are also displayed (illustration of details of these names is omitted). In other words, this menu screen is one displaying that a tone color of organ tone color group has been selected and the display of "ORGAN" in the middle stages indicates that the selected tone color is the organ tone color group and sixteen types of selectable tone colors are displayed in the lower stages. The name of the tone color corresponding to the tone color code in the register UTC (PopOrgan 1 in this example) is displayed by cursor and also is displayed as the selected tone color in the upper stage. In this example, a tone color group for one switch is fixed but, alternatively, any desired tone color group may be assigned to one switch. Such tone color switch to which a desired tone color group can be assigned is called a white switch and, in the case of a white switch, the menu screen can be changed by page selection. Description of this arrangement will be omitted.

In step 29, parameter data corresponding to the tone color code in the register UTC is supplied to the tone source circuit 19. In the tone source circuit 19, tone color is formed in accordance with the paremeter data supplied in a channel to which the upper keyboard tone is assigned.

Description will now be made about a case where the same switch in certain tone group switches has been continuously operated. In this case, this switch functions as a switch of a mode in which contents of tone control information (tone color, i.e., name of voice or rhythm in this example) which has been selected by the first operation of the switch are adjusted.

Figure 14:
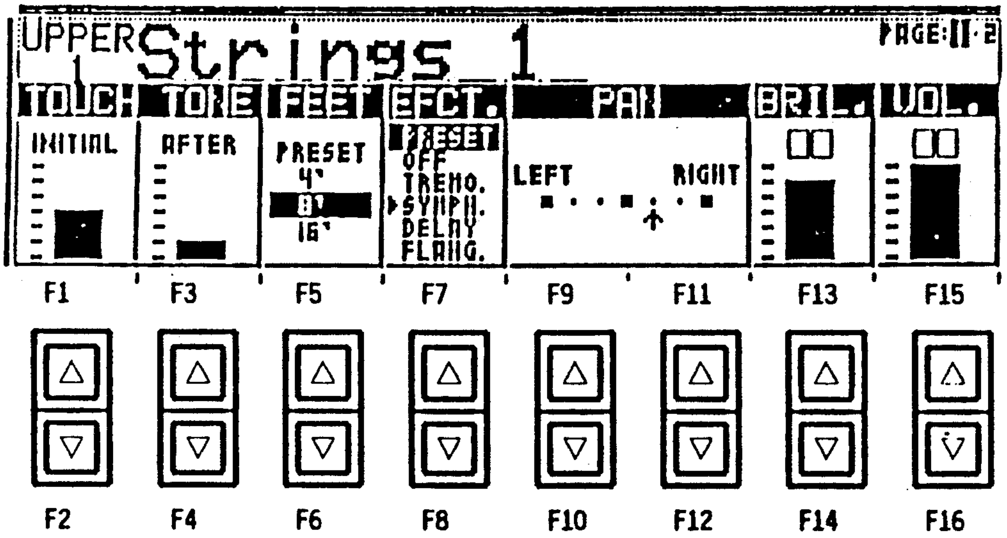
FIG. 14 is a diagram showing an example of an upper keyboard tone color (UT voice) adjusting screen displayed in the display of FIG. 1.

Assume, for example, that a certain switch among the upper keyboard tone color switches UT has been continuously operated. At the first operation, GN is set to 1 in step 25 of FIG. 4. At the second operation, GN=1 in step 24 is YES and the routine proceeds to step 30. In this step 30, whether or not there is coincidence between the number of the switch in which the current on-event has taken place in the buffer BUF and the number of the switch in which the preceding on-event has taken place in the register UTO is examined. The result is YES in the case of continuous operation and the routine proceeds to step 31 in which GN is set to 2. GN=2 is the screen number indicating the upper keyboard voice adjusting screen. Then, preparation is made for displaying the upper keyboard voice adjusting screen in the display 11 (step 32) and the display is changed to the upper keyboard voice adjusting screen (step 33). FIG. 14 shows an example of the upper keyboard voice adjusting screen when the selected tone color is "STRINGS 1". In this adjusting screen, parameters such as touch, tone, feet, effect, pan, brilliance and volume which establish contents of the particular tone color are displayed and each of these parameters can be set and adjusted by operating a corresponding one of the function switches F1–F16. This operation will be described more fully later.

The hold function will now be described. When the hold switch HLD has been turned on, a hold switch on-event processing of FIG. 5 is executed. In this processing, the value of a 1-bit hold register HLDR is inverted and, when HLDR is 1, the LED attached to the hold switch HLD is lighted whereas when HLDR is 0, the LED is extinguished. When the HLDR is 1, it indicates the hold mode.

When, for example, a certain switch of the upper keyboard tone color switches UT has been operated during the hold mode, step 22 of FIG. 4 becomes YES and the routine proceeds to step 34. In this step, the tone color code AU(BUF) which has been read from the upper keyboard assigned tone color code table AU in response to the switch number of the buffer BUF is stored in the upper keyboard tone color code register UTC. Then, in step 35, whether GN is 1 or not is examined. When one of the upper keyboard tone color switches UT has been turned on during GN is not 1, GN=1 is NO and the routine proceeds to step 29. In this case, the screen change processing of steps 26–28 could be made because the screen number GN is different but the routine proceeds to step 29 without execution of the screen change processing. The contents of the upper keyboard tone color code register UTC, however, become a tone color code which has been newly selected in step 34. In a case where the tone color has changed to the same screen number GN=1, step 35 is YES and the routine proceeds to step 28 in which the menu screen of the selected tone color is displayed and the selected tone color is displayed by the cursor.

Figure 6:
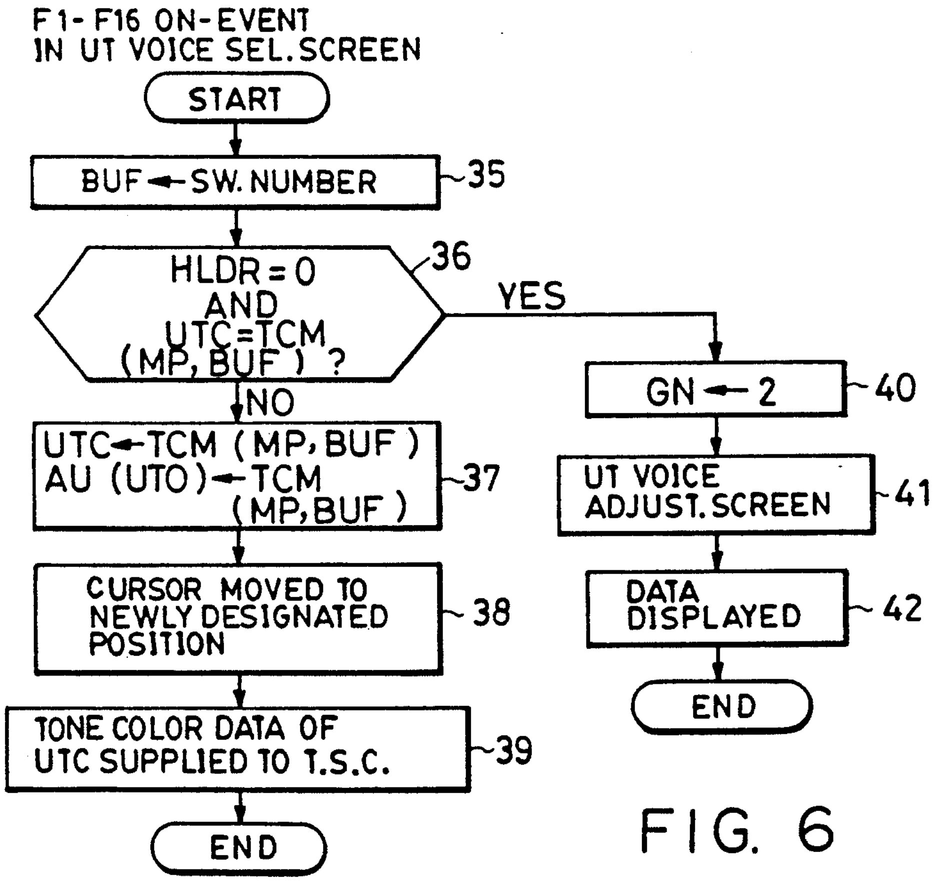
FIG. 6 is a diagram showing an example of a flow chart of an on-event of function switches F1–F16 in an upper keyboard tone color (UT voice) selection screen.

In this embodiment, a desired tone color in the tone color group can be selected as desired in the tone color selection menu as shown in FIG. 13. For this purpose, the selection is made by operating the function switches F1–F16 and moving the cursor. When one of the function switches F1–F16 has been operated in the upper keyboard voice menu of FIG. 13, processing as shown in FIG. 6 is executed.

The number of the turned on function switch (one of F1–F16) is stored in the buffer BUF (step 35). Then, whether or not the hold register HLDR is 0 and UTC=TCM(MP, BUF) (step 36). In other words, whether or not the mode is not the hold mode and a tone color code TCM(MP, BUF) which has been read from the tone color code table TCM by combination of the page number of a menu page register MP and the function switch number in the buffer BUF of the function switch which has been turned on is the same as the tone color code in the tone color code register UTC. If result is NO, the tone color code TCM(MP, BUF) which has been selected by the current on-event is stored in the tone color code register UTC and the tone color code TCM(MP, BUF) is stored in address position AU(UTO) in the upper keyboard assigned tone color code table AU which is designated by the tone color switch number of the old register UTO (step 37).

Then, the cursor position of the menu screen is moved to a position corresponding to the newly designated position, i.e., a position corresponding to the turned-on function switch (step 38). In step 39, parameter data corresponding to the tone color code of UTC is supplied to the tone source circuit 19. The tone source circuit 19 forms a tone color corresponding to the supplied parameter data in the channel to which the upper keyboard tone has been assigned.

In the above described manner, the tone color selection mode is brought about by the first operation of a desired tone color switch and a tone color selection menu screen of a desired tone color group as shown in FIG. 13 is displayed. By operation of a desired function switch (one of F1–F16) in this state, a desired tone color in the tone color group is selected and its tone color code is stored in the tone color code register UTC. This tone color code is also stored at address position AU(UTO) corresponding to the switch number UTO of the tone color switch in the upper keyboard assigned tone color code table AU. Assignment of a desired tone color to a tone color switch is thereby realized.

In a case where the same function switch (one of F1–F16) has been continuously operated, preceding tone color code UTC coincides with new tone color code TCM(MP, BUF). If the mode is not the hold mode, step 36 is YES and the routine proceeds to step 40 and the screen number GN is set to 2 and the screen of the display 11 is changed to the upper keyboard tone color adjusting screen shown in FIG. 14 (steps 41, 42). Accordingly, the mode can be changed also by continuous operation of the same function switch (one of F1–F16).

Adjustment of parameters in the adjusting screen will now be described.

Figure 7:
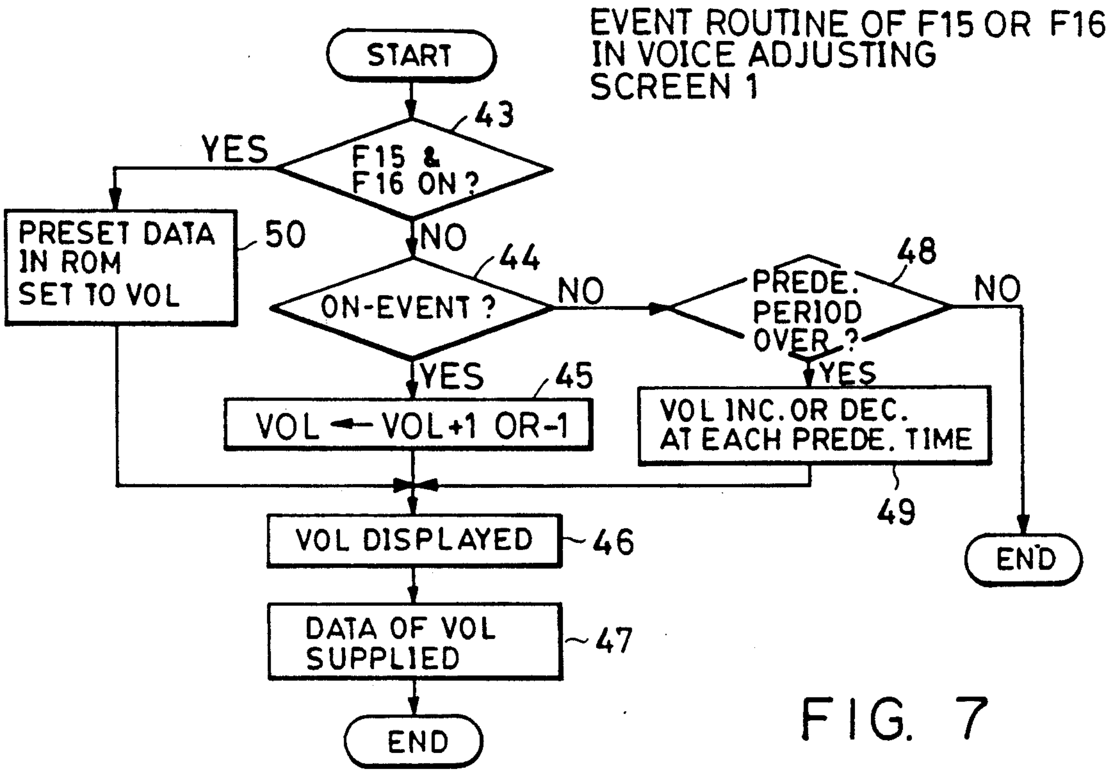
FIG. 7 is a diagram showing an example of a flow chart of an event routine of function switches F15 and F16 in a tone color (voice) adjusting screen 1.
Figure 15:
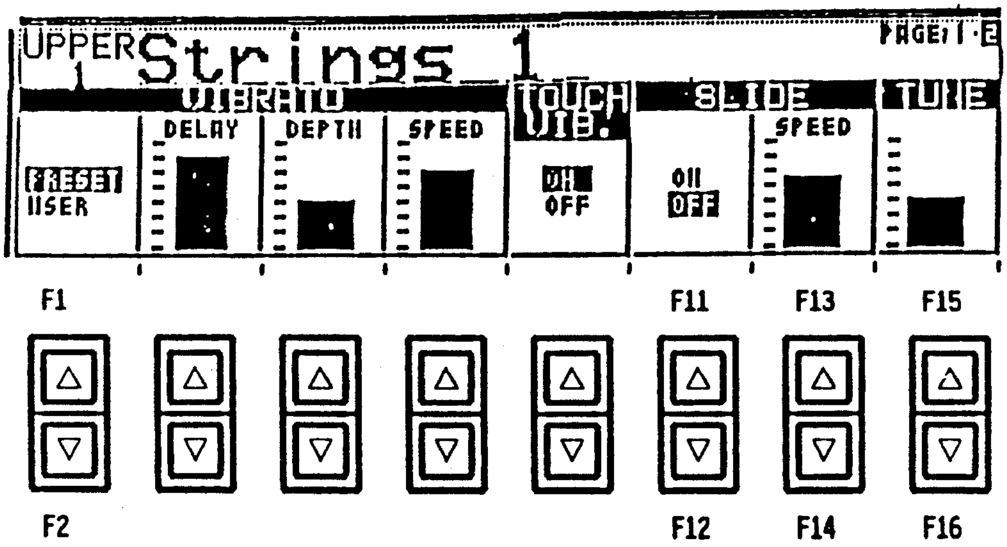
FIG. 15 is a diagram showing another example of the upper keyboard tone color (UT voice) adjusting screen displayed in the display of FIG. 1.

FIG. 14 shows an example of page 1 of the upper keyboard tone color adjusting screen and FIG. 15 shows an example of page 2 thereof. In a case where the tone volume level of this tone color is to be adjusted in the screen of page 1 shown in FIG. 14, the function switch F15 or F16 is turned on. In this case, the bargraph type level display is incremented or decremented by turning on of the switch F15 or F16. Processing to this end is shown in FIG. 7.

When either the switch F15 or F16 is on, judgement of YES is made in step 44 and the routine proceeds to step 45 where contents of a volume register VOL are increased or decreased. In step 46, data of this volume register VOL is displayed in the form of a bar graph in the display 11. Tone volume level data of the volume register VOL corresponding to this tone color is supplied to the tone source circuit 19 (step 47).

There is a function according to which, when the switch F15 or F16 is maintained in the on-state for a predetermined period and over, the value of the volume VOL is automatically increased or decreased at each predetermined time (steps 48 and 49). When the switches F15 and F16 have been simultaneously turned on, the mode is changed to a preset data selection function. That is, when step 43 is YES, the routine proceeds to step 50 in which preset volume data stored in a preset memory is read out and set to the register VOL.

Figure 8:
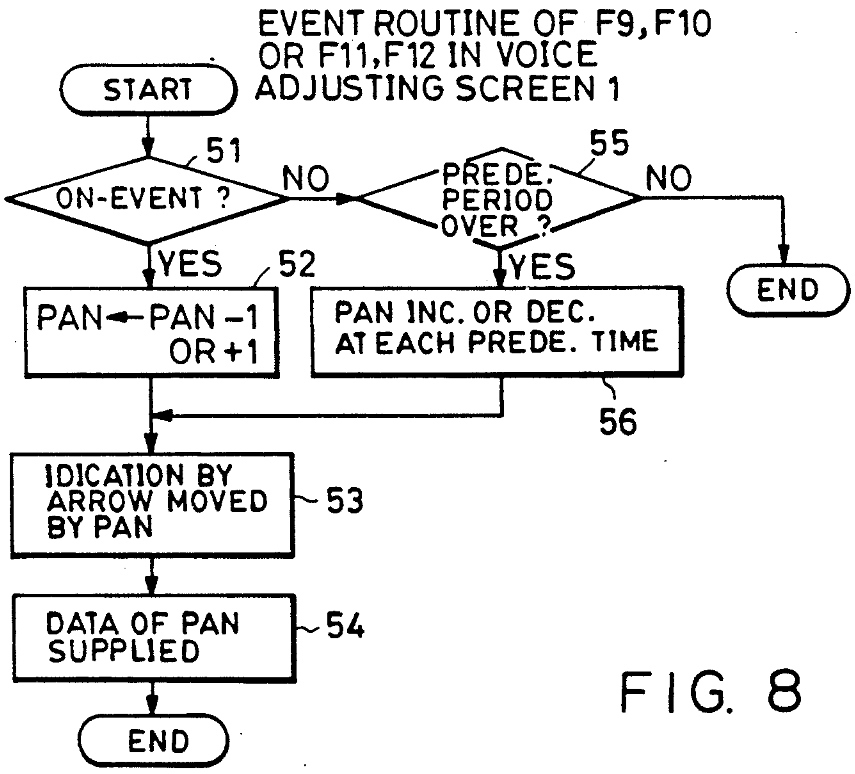
FIG. 8 is a diagram showing an example of a flow chart of an event routine of function switches F9 and F10 or F11 and F12 in the tone color (voice) adjusting screen 1.

When parameter of the pan effect (PAN) of this tone color is to be adjusted in the screen shown in FIG. 14, either the switch F9 or F10 or either the switch F11 or F12 is turned on. In this case, depending upon operation of the left and right switches F9, F10 or F11, F12, the arrow moves to left or right to indicate the state of pan. Flow chart of processing to this end is shown in FIG. 8. Any of the switches F9 and F10 may be turned on as the left switch and any of the switches F11 and F12 may be turned on as the right switch.

When either the left switch F9, F10 or right switch F11, F12 has been turned on, judgement of on-event YES is made in step 51 and the routine proceeds to step 52 where contents of a pan register PAN are increased or decreased. In step 53, the indication by the arrow in the display 11 is moved to left or right in accordance with the data of the pan register PAN. In response to this tone color, the data of the pan register PAN is supplied to the tone source circuit 19 (step 54). In the same manner as described above, there is a function according to which, when the switch is maintained in the on state for a predetermined period of time and over, the value of the pan register PAN is automatically increased or decreased at each predetermined time (steps 55 and 56).

Description will now be made about an embodiment in which common selection means is provided for selecting a desired parameter from among listed parameters or selecting a preset parameter. In the screen shown in FIG. 14, the state of display about this embodiment is shown, e.g., the case of adjusting parameter concerning effect "EFCT" which is one of tone control parameters.

In the display column of the effect EFCT in FIG. 14, parameters for setting or adjusting contents of the tone control information (i.e., tone control parameter concerning effect), i.e., OFF (turning off of the effect), TREMO (tremolo effect), SYMPH (symphonic effect), DELAY (delay effect) and FLANG are listed up. A display of "PRESET" indicating preset parameter of the tone control information (i.e., tone control parameter concerning the effect) is also made. By operation of the function switches F7 and F8 corresponding to the display column of the effect EFCT, the cursor is moved to select a desired one of the listed parameters OFF, TREMO, SYMPH, DELAY and FLANG or select the preset parameter PRESET. Depending upon the position of the cursor, what the selected parameter is is displayed. In the example of the column of the effect in FIG. 14, the cursor is at the position of PRESET indicating that the preset parameter has been selected.

For another example, in the adjacent column of feet FEET also, selection between listed up parameter groups 4', 8' and 16' and preset can be made. In the example illustrated in FIG. 14, the cursor is at 8' (8 feet) indicating that 8' among the listed up parameter display of 4', 8' and 16' has been selected.

A preset data memory is provided in the ROM 13 or RAM 14 so that data representing preset parameter can be stored. When the preset PRESET has been selected, data of the preset parameter which is stored in the preset data memory is read out and contents thereof are displayed. In the example of FIG. 14, one of the listed up parameters is indicated by a triangle cursor. When SYMPH is indicated as illustrated, it indicates that the preset contents of the effect are the symphonic effect.

By making selection of parameter of tone control information (i.e., manual setting) and selection of preset parameter of the tone control information by comon selection means as described above, the selection operation is facilitated and the number of the selection means (i.e., switches) is saved and, as a result, space and the manufacturing cost can be saved.

Figure 9:
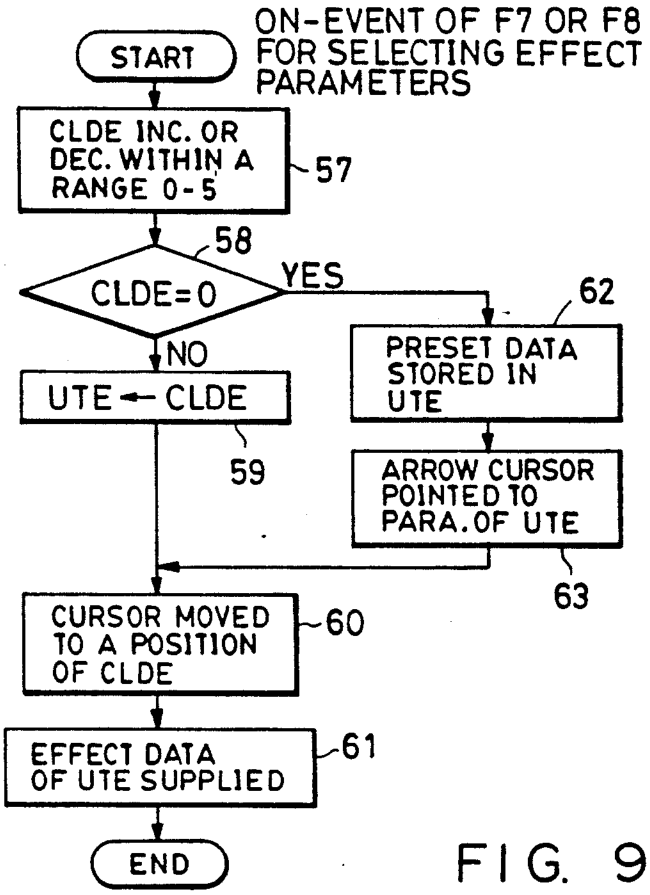
FIG. 9 is a diagram showing an example of a flow chart of an on-event routine of function switches F7 and F8 for selecting effect parameters.
Figure 10:
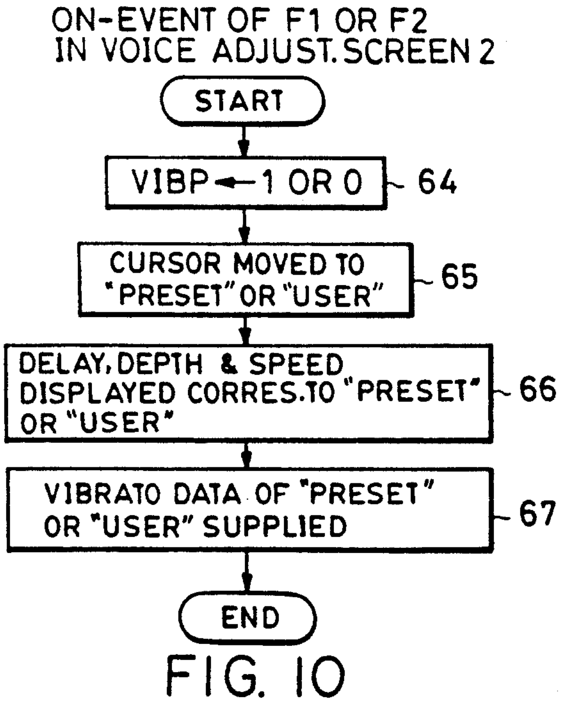
FIG. 10 is a diagram showing an example of a flow chart of an on-event routine of function switches F1 and F2 in a tone color (voice) adjusting screen 2.
Figure 11:
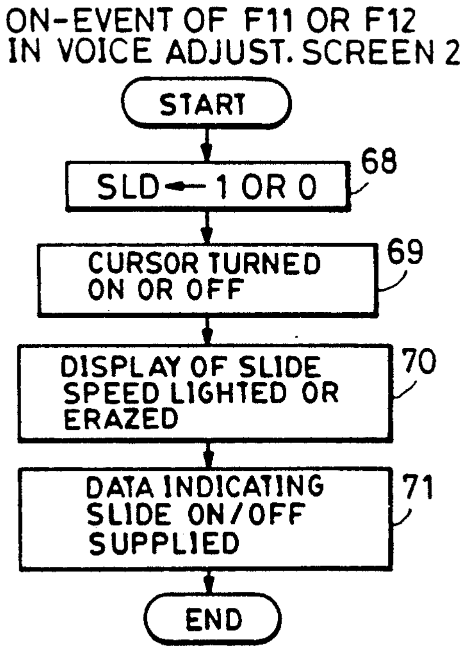
FIG. 11 is a diagram showing an example of a flow chart of function switches F11 and F12 in the tone color (voice) adjusting screen 2.

When the function switch F7 or F8 concerning the effect EFCT has been operated in the screen of FIG. 14, a processing program shown in FIG. 9 is executed whereby the above described selection between the preset parameter and the listed up parameters is made.

In FIG. 9, in step 57, contents of a cursor position register CLDE are decremented or incremented according to the turned-on switch F7 or F8. The value of the cursor position register CLDE increases or decreases within a range from 0 to 5 and corresponds to the preset or respective parameters as follows: 0=PRESET, 1=OFF, 2=TREMO, 3=SYMPH, 4=DELAY, 5=FLANG.

Then, whether the value of the cursor position register CLDE is 0 or not is examined (step 58) and, when the result is NO, the value of the register CLDE is stored in an upper keyboard tone effect register UTE (step 59). Then, the cursor is moved to a position corresponding to the value of the register CLDE (the bright portion and dark portion of the display are inverted in the cursor position as illustrated) and effect parameter data corresponding to the value of the register CLDE is supplied to the tone source circuit 19 (steps 60 and 61).

In a case where the value of the cursor position register CLDE is 0, the routine proceeds to step 62 where parameter data which is preset in correspondence to the upper keyboard tone effect is read from the preset data memory and stored in the upper keyboard tone effect register UTE. Then, the triangle cursor display is moved to the position of the parameter indicated by the register UTE for indicating it (step 63). Thereafter, processing of steps 60 and 61 is executed.

In the parameter adjusting screen shown in FIG. 15, parameter adjustment of the vibrato effect (VIBRATO), on/off selection of the touch vibrato effect (TOUCH VIB), parameter adjustment of the slide (pitch slide) effect (SLIDE) and tuning adjustment (TUNE) can be made.

As one of the parameter adjustment of the vibrato effect, selection between use of a preset parameter and use of a parameter made by a user is made by operation of the switches F1 and F2. An example of this processing is executed according to the flow chart of FIG. 10. When the switch F1 has been turned on, 1 is set in the register VIBP to indicate that the preset data has been selected. When the switch F2 has been turned on, 0 is set in the register VIBP to indicate that user data has been selected (step 64). Then, adjusting data of delay time (DELAY), depth (DEPTH) and speed (SPEED) are respectively read from the preset data memory when the preset data has been selected and from the user data memory when the user data has been selected and the read out data is displayed in the form of a bar graph (step 66). Vibrato data consisting of these delay time (DELAY), depth (DEPTH) and speed (SPEED) is supplied to the tone source circuit 19 (step 67).

As one of the parameter adjustment of the slide effect, on/off selection of the slide effect is made by operation of the switches F11 and F12. An example of this processing is executed according to the flow chart of FIG. 11. When the switch F11 has been turned on, 1 is set in the register SLD to indicate that the slide effect is on. When the switch F12 has been turned on, 0 is set in the register SLD to indicate that the slide effect is off (step 68). Then, the cursor is moved to either ON or OFF depending upon the value of the register SLD (step 69). Thereafter, the graph display of slide speed is displayed when the slide effect is on and it is erased when the slide effect is off (step 70). Then, data indicating slide on/off is supplied to the tone source circuit 19 (step 71).

This invention can be carried out not only by a software processing as described above but also by an exclusively provided hardware circuit. The position of display in the display 11 is not limited to the one in the above described embodiment.

As described above, according to the invention, the switch function is automatically changed in such a manner that, when the switch means for selecting tone control information has been operated once, the switch functions as a switch of a mode selecting the tone control information and, when it has been continuously operated, the switch functions as a switch of a mode adjusting contents of the tone control information which has been selected by the first operation. No particular mode selection switch therefore is required so that the number of switches can be reduced. This arrangement is advantageous in space for arranging switches, manufacturing cost and operability. In addition, when the switch has been continuously operated, it functions as a switch of a mode for adjusting contents of the tone control information which has been selected by the first operation and, accordingly, advantageous results including easiness in using the switch can be derived.

Further, according to the invention, selection of parameter of tone control information (i.e., manual setting) and selection of preset parameter concerning this tone control information can be made by common selection means so that operability is improved and the number of the selection means (switches) can be reduced. This arrangement is advantageous in the space for arranging switches and therefore in manufacturing cost.

Further, according to the invention, owing to the hold function in the screen, selection or setting or adjusting of tone control information which is flexible and of improved operability can be realized.

I claim:

1. An electronic musical instrument comprising:

switch means for selecting tone control information;

mode judging means for detecting whether said switch means has been operated once or continuously for predetermined plural times and, responsive to this detection, judging presence of a first mode in which said tone control information is to be selected when said switch means has been operated once and presence of a second mode in which contents of said tone control information which has been selected by the first operation are to be adjusted when said switch means has been continuously operated;

first mode executing means for executing, when said mode judging means has judged presence of the first mode, selection of the tone control information corresponding to the operation of said switch means; and second mode executing means for executing, when said mode judging means has judged presence of the second mode, adjustment of the contents of the tone control information which has been selected by the operation of said switch means.

2. An electronic musical instrument as defined in claim 1 further comprising display means for performing display corresponding to the mode whose presence has been judged by said mode judging means.

3. An electronic musical instrument as defined in claim 2 further comprising a hold switch; and means for controlling, in response to turning on of said hold switch, so as not to change the display by said display means even when said mode has been changed.

4. An electronic musical instrument as defined in claim 1 wherein said second mode executing means comprises operation means for variably adjusting at least one of plural tone control parameters which constitute the tone control information.

5. An electronic musical instrument comprising:

display means for displaying, with respect to a tone control element, tone parameter symbols corresponding to plural selectable parameters and a preset parameter symbol corresponding to a predetermined preset parameter;

selection means having a common selector for selecting one of the parameter symbols from among the tone parameter and preset parameter symbols by designating a desired symbol from among the displayed symbols to provide the tone control element;

memory means for storing data identifying the predetermined preset parameter;

display control means for displaying, when one of the tone parameter symbols has been selected by the selection means, selection of the corresponding selectable parameter in the display means and for displaying, when the preset parameter symbol has been selected, selection of the corresponding predetermined preset parameter in said display means; and tone control means for performing, when a parameter symbol from among the displayed parameter symbols has been selected by the selection means, control of a tone in accordance with the selected parameter and for performing, when the preset parameter symbol has been selected by the selection means, control of a tone in accordance with the data of the preset parameter which is stored in the memory means.

6. An electronic musical instrument as defined in claim 5 wherein the display control means generates, when the preset parameter symbol has been selected, a display for identifying the predetermined preset parameter on the basis of the data stored in the memory means.

7. An electronic musical instrument as defined in claim 5 wherein the display control means displays the selected parameter from among the displayed selectable parameter using a cursor display.

8. An electronic musical instrument as defined in claim 5 wherein the display control means identicates the preset parameter corresponding to the data stored in the memory means from among the displayed parameters using a cursor display.

9. An electronic musical instrument comprising:

display means for displaying tone control information;

switch means for performing at least one of selection, setting and adjusting about the tone control information;

control means for controlling to change, in accordance with performance of said switch means, a display of said display means in response to the performance of said switch means;

hold switch means for designating to prohibit change of the display of said display means; and prohibition control means for prohibiting, when the prohibition has been designated by said hold switch means, the change of the display of said display means by said control means.

* * * * *